US007105790B2

(12) United States Patent
Lamorlette

(10) Patent No.: US 7,105,790 B2
(45) Date of Patent: Sep. 12, 2006

(54) PROCESS TO CONTROL THE TRAJECTORY OF A SPINNING PROJECTILE

(75) Inventor: Gérard Lamorlette, Bourges (FR)

(73) Assignee: GIAT Industries, Versailles (FR)

( * ) Notice: Subject to any disclaimer, the term of this patent is extended or adjusted under 35 U.S.C. 154(b) by 132 days.

(21) Appl. No.: 10/848,137

(22) Filed: May 19, 2004

(65) Prior Publication Data
US 2006/0169833 A1    Aug. 3, 2006

(30) Foreign Application Priority Data
May 19, 2003 (FR) ................... 03 06003

(51) Int. Cl.
F41G 7/00 (2006.01)
F42B 15/01 (2006.01)
G01C 15/14 (2006.01)
G01S 5/02 (2006.01)

(52) U.S. Cl. ............... 244/3.2; 244/3.1; 244/3.15; 701/200; 701/213; 342/357.01; 342/357.06

(58) Field of Classification Search .......... 244/3.1–3.3; 701/200, 213–221, 1, 3; 342/357.01–357.17
See application file for complete search history.

(56) References Cited

U.S. PATENT DOCUMENTS 3,741,500 A * 6/1973 Liden ................. 244/3.2
4,026,498 A * 5/1977 Platus ................. 244/3.23
5,001,647 A * 3/1991 Rapiejko et al. ........ 701/220
5,253,823 A * 10/1993 Lawrence ............. 244/3.15
5,344,105 A    9/1994 Youhanaie
5,429,322 A * 7/1995 Waymeyer ............ 244/3.15
5,432,520 A    7/1995 Schneider et al.
5,762,290 A * 6/1998 Dupont ............... 244/3.15

FOREIGN PATENT DOCUMENTS

| DE | 40 25 515 A1 | 2/1992 |
|---|---|---|
| EP | 0 583 972 A1 | 2/1994 |
| EP | 0 905 473 A1 | 3/1999 |
| EP | 1 006 335 A1 | 6/2000 |
| WO | WO 03/078916 A1 | 9/2003 |

* cited by examiner

Primary Examiner—Bernarr E. Gregory
(74) Attorney, Agent, or Firm—Oliff & Berridge, PLC

(57) ABSTRACT

A process to control the trajectory of a spinning projectile. The projectile's accelerations are measured by means of an inertial unit in three axes within a reference linked to the projectile so as to prepare the piloting commands for the projectile's trajectory. The velocity vector V components ($V_X$, $V_Y$, $V_Z$) of the projectile are measured using a global positioning system (GPS) along three axes and within a land reference ($G_X$, $G_Y$, $G_Z$). Based on these measurements, the components ($\Gamma_X, \Gamma_Y, \Gamma_Z$) of the acceleration vector $\Gamma$ are evaluated in the same land reference (GX, GY, GZ). At each of these measurements and periodical evaluations by the GPS, the Euler angles of the projectile are recalculated by combining the resultants of the velocity (V) and acceleration ($\Gamma$) measurements given by the GPS and those of the acceleration given by the inertial unit.

11 Claims, 2 Drawing Sheets

PROCESS TO CONTROL THE TRAJECTORY OF A SPINNING PROJECTILE

BACKGROUND OF THE INVENTION

The technical scope of the invention is that of processes enabling the control of the trajectory of a spinning projectile and namely the control of the trajectory of a projectile fired from a cannon.

Projectiles fired from cannons have, in theory, a well known trajectory. However, non reproducible external factors (such as wind, temperature and atmospherical pressure) or internal factors (such as initial velocity and aerodynamic coefficients) can influence the trajectory.

This results in deviations in the impact on the ground of the projectile which, at the current maximum artillery range (around 35 km) can approach, as standard deviations, 500 m in range and 150 m in direction.

So as to improve firing accuracy, it is known to correct the projectile's trajectory in range by deploying one or several aerobrakes. Patent FR2786561 describes such a solution. Standard deviations in accuracy are, at 35 km, of around a hundred meters in range as well as in direction.

Another known solution is to ensure the autonomous and continual command of the trajectory by means of aerodynamic elevons. These are controlled by an autopilot onboard the projectile. The standard deviations in accuracy may thus be reduced to around ten meters or so in range and in direction. Moreover, by using the gliding effect it is possible to notably increase the maximal range (which may exceed 65 km with no additional propellant).

These autonomous in flight projectiles are provided with a satellite positioning system (more commonly known as GPS or global positioning system) which allows them to self locate with respect to their trajectory. Before being fired, the projectile is programmed with the coordinates of the target. It thereafter determines for itself its actual position in flight and prepares, using data supplied by an on-board inertial unit and appropriate algorithms, the control commands for the elevons.

The projectile also incorporates an inertial unit, comprising accelerometers and gyros, which supplies (for a reference linked to the projectile) the non-gravitationial instantaneous spin and acceleration vector components to which the projectile is subjected.

Three integrations made using the spin instantaneous vector components may thus supply the Euler angles of the projectile (pitch, yaw and roll) required to prepare the control commands of the trajectory.

Such a solution is classically used in projectiles such a cruise missiles that do not spin, or spin very little, (sp in rate of around 0.5 revs/s) and which are only subjected to reduced longitudinal accelerations (of around 10 times gravitational acceleration g). These projectiles incorporate very accurate but costly inertial units.

Such inertial units cannot be used in cannon-fired projectiles, since they are subjected to substantial accelerations borne by the projectile during firing. Additionally, the cost of the inertial units used in such projectiles must be as low as possible.

Inertial units that can be used in cannon-fired projectiles are of average accuracy and present drift leading to statistically high error in roll position reaching up to 90°. It is thus impossible to pilot the projectile, which is unable to reach its target. This phenomenon is further accentuated when the auto-spin velocity of the projectile is not nil.

One previously envisaged solution consists in estimating the initial roll position by applying reference piloting commands, during a preliminary phase, and deducting the roll position of the velocity components measured by the GPS locater.

However, this process has the drawback of not ensuring the guidance of the projectile during the application phase of the reference piloting commands. This results in a diminution of performances (reduction in maximal range and deterioration of accuracy for a given range).

SUMMARY OF THE INVENTION

The aim of the invention is to propose a process to overcome such drawbacks.

Thus, the process according to the invention reliably ensures excellent guidance accuracy, even for a cannon-fired spinning projectile.

The process according to the invention thus ensures guidance using a low cost inertial unit with average accuracy. It thus allows the cost of the target seekers of guided projectiles to be significantly reduced whatever the type of projectile (cannon-fired projectile, missile or rocket).

Thus, the invention relates to a process to control the trajectory of a spinning projectile, process wherein the projectile's accelerations are measured by means of an inertial unit in three axes within a reference linked to the projectile so as to prepare the piloting commands for the projectile's trajectory, process wherein:

the velocity vector V components ($V_X$, $V_Y$, $V_Z$) of the projectile are measured using a global positioning system along three axes and within a land reference (GX, GY, GZ), based on these measurements, the components ($\Gamma_X$, $\Gamma_Y$, $\Gamma_Z$) of the acceleration vector $\Gamma$ are evaluated in the same land reference (GX, GY, GZ), at each of these measurements and periodical evaluations by the GPS, the Euler angles of the projectile are recalculated by combining the resultants of the velocity (V) and acceleration ($\Gamma$) measurements given by the GPS and those of the acceleration given by the inertial unit.

According to an essential characteristic of the invention, for the calculations of the Euler angles and/or the piloting, instead of the acceleration values measured by the inertial unit, so-called corrected acceleration values are used:

$$\gamma_{CX} = \gamma_X \Gamma / \gamma; \ \gamma_{CY} = \gamma_Y \Gamma / \gamma; \ \Gamma_{CZ} = \gamma_Z \Gamma / \gamma$$

expressions in which $\Gamma = \sqrt{(\Gamma_X^2 + \Gamma_Y^2 + \Gamma_Z^2)}$ is the norm of the projectile's acceleration vector in the land reference such as evaluation thanks to the positioning system and $\gamma = \sqrt{(\gamma_X^2 + \gamma_Y^2 + \gamma_Z^2)}$ is the norm of the projectile's acceleration vector in the reference linked to the projectile such as measured by the inertial unit.

According to a particular embodiment of the invention, when the projectile has a canard type architecture (that is to say piloted by elevons positioned at its front part), the evaluation of the Euler angles is carried out during the piloted flight phase using a calculation of the constant of the incidence time.

$$\Lambda = \frac{-P_S - \sqrt{\Delta'}}{\Gamma^2},$$

expression in which $P_s$ is the scalar product of the velocity vector V and the acceleration vector $\Gamma$ measured or calculated from the GPS ($P_S = V.\Gamma$), and $\Delta'$ is a reduced discriminant $$\Delta' = (\Gamma^2 V^2 - P_S^2)\frac{\gamma_{CX}^2}{\gamma_{CT}^2},$$

expression in which $\gamma_{CT}$ is a corrected value of the transversal acceleration of the projectile ($\gamma_{CT}=\sqrt{(\gamma_{CY}^2+\gamma_{CZ}^2)}$).

Generally speaking, when the projectile is in the ballistic flight phase, the value of the incidence time constant $\Lambda$ will be rounded up to zero and the projectile's Euler angles will be calculated using the following formulae:

the pitch $\theta$ and yaw $\psi$ angles are equal to;

$$\theta=\arcsin(V_S/V); \ \psi=\arcsin(V_Y/V\cos\theta)$$

the roll angle $\phi$ being defined by:

$$\cos\varphi = \frac{q}{\sqrt{q^2=r^2}} \quad \sin\varphi = \frac{-r}{\sqrt{q^2+r^2}}$$

expressions in which q and r are respectively the angular pitch and yaw velocities of the projectile in a reference linked to the projectile, velocities measured by the inertial unit.

According to another characteristic, when the projectile is in the piloted flight phase:

the Euler angles of the projectile will be evaluated by the following formulae:

pitch angle $\theta$ (between $-\pi/2$ and $+\pi/2$):

$$\theta = \arcsin\left(\frac{V_Z + \Lambda\Gamma_Z}{U + \Lambda\gamma cx}\right)$$

yaw angle $\psi$ (between $-\pi$ and $+\pi$):

$$\cos\psi = \frac{V_X + \Lambda\Gamma_X}{(U + \Lambda\gamma cx)\cos\theta}$$

$$\sin\psi = \frac{V_Y + \Lambda\Gamma_Y}{(U + \Lambda\gamma cx)\cos\theta}$$

roll angle $\phi$:

$$\cos\varphi = \frac{\gamma_{z0}\gamma_{cz} + \gamma_{z0}\gamma_{cy}}{\gamma_{cy}^2 + \gamma_c^2}$$

$$\sin\varphi = \frac{\gamma_{z0}\gamma_{cy} + \gamma_{y0}\gamma_{cz}}{\gamma_{cy}^2 + \gamma_c^2}$$

expressions in which:

$$\gamma_{Y0}=(V_X\sin\psi-V_Y\cos\psi)/\Lambda,$$

$$\gamma_{Z0}=(U\sin\theta-V_Z)/\Lambda\cos\theta\text{et}$$

$$U^2=V^2-\Lambda^2\gamma_{cT}^2.$$

Advantageously, the evaluation of the components ($\Gamma^X$, $\Gamma_Y, \Gamma_Z$) of the acceleration vector $\Gamma$ in the land reference (GX, GY, GZ) will be carried out from N periodical measurements made by the GPS of components ($V_X, V_Y, V_Z$) of the velocity vector V of the projectile in the same land reference and with a sampling interval $\Delta t$, measurements to which a Kalman filter will be applied.

BRIEF DESCRIPTION OF THE DRAWINGS

The invention will become more apparent from the following description of a particular embodiment, such description made in reference to the appended drawings, in which.

DETAILED DESCRIPTION OF PREFERRED EMBODIMENTS

Figure 1:
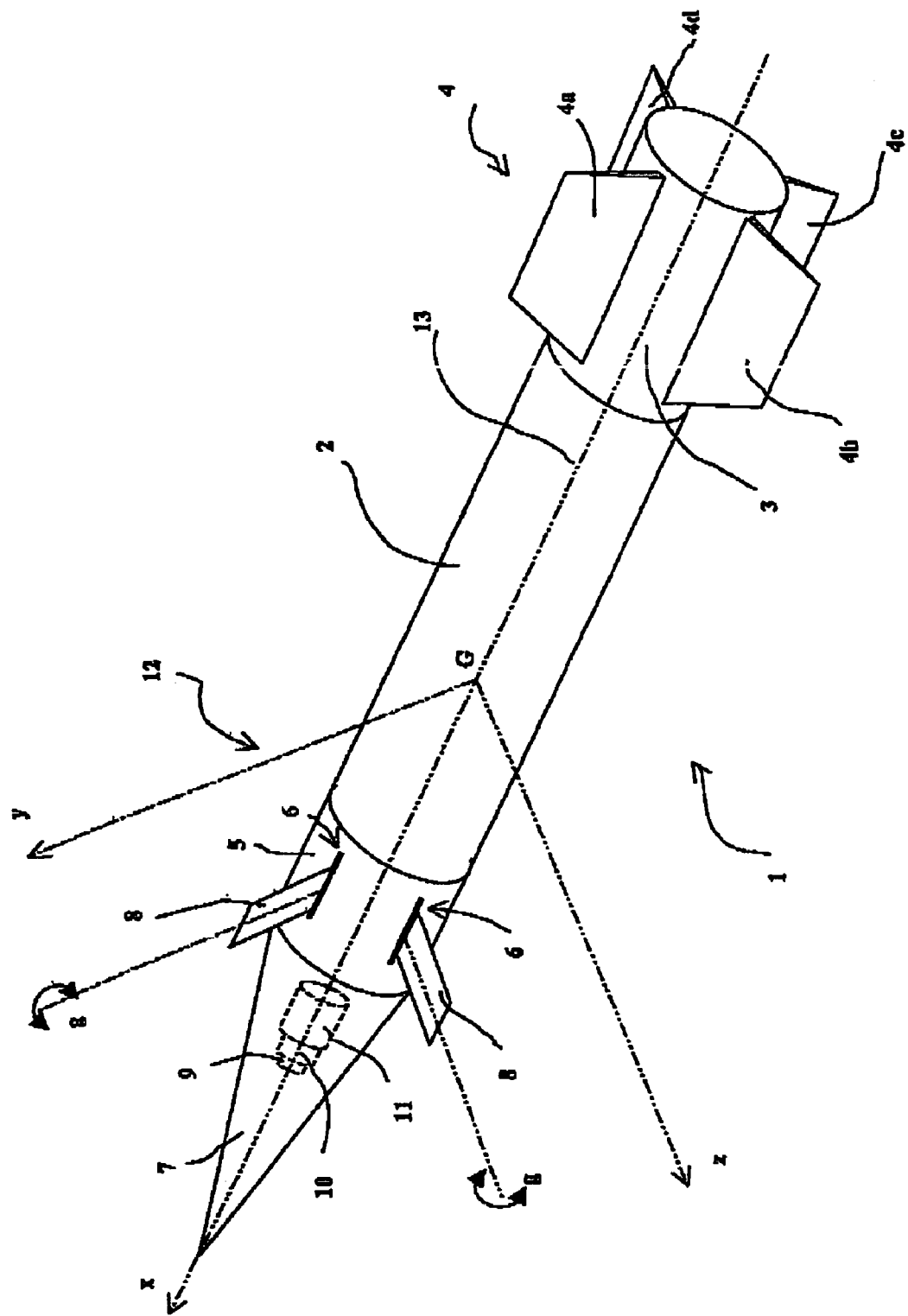
FIG. 1 is a top view of a cannon-fired canard type gliding projectile able to implement the process according to the invention.

FIG. 1 shows a gliding artillery projectile 1 that incorporates a body 2 inside which a useful charge is housed (not shown), for example an explosive load or sub-munitions.

The body 2 terminates with a rear portion 3 which may enclose a propellant or else pyrotechnic generator allowing the base drag to be reduced (such generators are better known under the term, base bleed).

The rear portion 3 is fitted with a cross-shaped boattail 4 formed of four fixed fins 4a, 4b, 4c, 4d. These fins will be made, for example, as sheet steel wound around the projectile body and will deploy upon exiting the gun barrel under the effect of their own elasticity (see namely patent DE4025515).

The body 2, at its front part, has a piloting device 5 that comprises four cross-shaped canard elevons is deployed through slots 6 made in the projectile body. Here, only two elevons can be seen. The elevons are associated in pairs, each pair of elevons representing a piloting plane (pitch or yaw).

The elevons 8 are controlled in rotation by back-geared motors (not shown). The rotation of each elevon is made around an axis g substantially parallel to the leading edge of the elevon and in a radial direction to the projectile.

The projectile is tipped by a nose cone 7 enclosing an electronic calculator 11 ensuring guidance and piloting. The nose cone also encloses an inertial unit 10 and a global positioning system (GPS) 9.

The projectile 1 is fired from an artillery cannon. Means not shown enabling firing whilst reducing the spin rate communicated to the projectile (sliding band, for example) and other means ensure the retention and subsequent release of the rear boattail 4 as well as the front elevons 8. Reference may be made to patent EP905473 for a more thorough description of these means, which are not the subject of this invention.

An orthonormed geometric reference 12 linked to the projectile is shown in FIG. 1. This reference comprises an axis Gx that is the axis 13 of the projectile, and axis Gy that is the pitch axis and an axis Gz that is the yaw axis. During its trajectory, the projectile is subjected to spin velocities (roll, pitch, yaw) and to accelerations along the three axes thus defined. In a known manner, an action on the elevons 8 allows the accelerations to which the projectile is subjected to be modified and its trajectory to be corrected.

Classically, the target coordinates for a projectile are expressed in a land reference and are introduced (before firing or during the trajectory) into the calculator 11 by means of a programming device.

The global positioning system 9 enables the portion of the projectile to be known at any instant in the land reference as well as the velocity vector components (V). By computation, it is possible to determine the components of the acceleration vector (Γ) of this projectile in the land reference from the velocity V.

Figure 2:
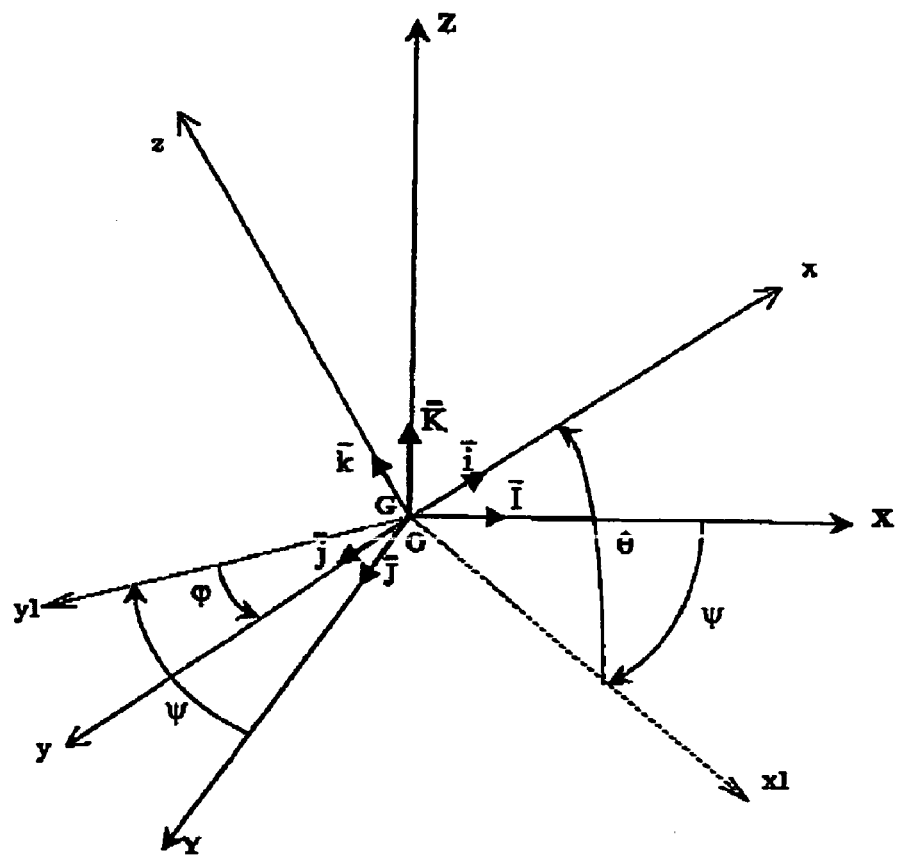
FIG. 2 is a schema showing the land reference linked to such a projectile as well as the location of the Euler angles.

FIG. 2 shows the orthonormed geometric reference Gx, Gy, Gz linked to the projectile (not shown). This reference comprises an axis Gx (or roll axis) that is the projectile axis, an axis Gy that is the pitch axis of the projectile and an axis Gz that is the yaw axis (unitary vectors on these axes: $\bar{i}, \bar{j}, \bar{k}$).

FIG. 2 also shows the land reference reduced to the centre of gravity G which comprises the axes GX, GY and GZ (unitary vectors: $\bar{I}, \bar{J}, \bar{K}$).

During its trajectory, the projectile is subjected to velocities and accelerations along the three axes thus defined. Classically, an action on the piloting elevons 8 allows the accelerations to which the projectile is subjected to be modified and its trajectory to be corrected.

To this end, the electronic calculator 11 prepares the required acceleration orders in the pitch and yaw directions.

This is performed classically using a guidance law, for example the proportional navigation law. This guidance law uses data related to the location of the target (land reference), that related to the location of the projectile (land reference) and the data related to the velocity and acceleration of the projectile 1 in its own reference.

This projectile velocity and acceleration data are supplied by the inertial unit 10 in the projectile.

Known guidance laws usually use a calculation of the Euler angles ($\omega, \theta, \phi$) (when the respective positions of the projectile and its target are known in a fixed reference). These angles enable reference GxGyGz linked to the projectile to be angularly located with respect to the fixed land reference GXGYGZ. It is thereafter possible for the velocity and acceleration measurements made in the projectile reference to be converted into variables evaluated in the land reference.

As may be seen in FIG. 2, angle $\psi$ or yaw angle, is the angle between the fixed direction GX and the $Gx_2$ projection on the GXY plane of projectile axis Gx.

Angle $\theta$ or pitch angle, is the angle between projectile axis Gx and the projection $Gx_1$ of this axis on plane GXGY.

Roll angle $\phi$ is the angle between axis Gy and axis $Gy_1$ orthogonal to axis $Gx_1$.

As explained previously, known projectiles determine the Euler angles from integrating combinations of the three components of the instantaneous spin vector in a reference linked to the projectile such as measured by the onboard inertial unit 10.

This calculation requires a very accurate inertial unit and has low deviation (especially from the perspective of the roll angle measurement).

According to the invention, the Euler angles will e determined by implementing an algorithm that uses a periodical measurement of the components ($V_x, V_y, V_z$) of the projectile's velocity vector V for three axes and in the land reference (GX, GY, GZ). This measurement is performed by the GPS locating device 9.

First of all, the results of the velocity V measurement are used to calculate the components ($\Gamma_x, \Gamma_y, \Gamma_z$) of the acceleration vector Γ in the same land reference (GX, GY, GZ).

In parallel, the onboard inertial unit 10 supplies a measurement of the angular velocities (yaw, pitch, roll) of the projectile as well as a measurement of the non gravitational acceleration components of the projectile in the reference linked to it (Gx, Gy, Gz).

Then, for each of these measurements and periodical GPS evaluations, the values of the projectile's Euler angles are calculated by combining the results of the measurements given by the GPS and those given by the inertial unit.

Thus, any inaccuracies and deviations of the inertial unit used are corrected at each GPS localisation of the projectile and the deviations in the evaluation of the Euler angles are thereby avoided.

The localisation frequency may be between 0.1 and 10 Hz.

It is therefore no longer necessary to apply reference piloting orders during a preliminary flight phase. Guidance of the projectile is thus possible during the whole controlled flight phase, thereby increasing the range and accuracy of the projectile.

During a first phase of the process according to the invention, the components ($\Gamma_x, \Gamma_y, \Gamma_z$) of the acceleration vector Γ are calculated in the same land reference (GX, GY, GZ).

This calculation may be implemented by smoothing of the KALMAN type applied to different successive measurement values of the velocity V by the GPS locating device 9.

For example, five successive measurements of the velocity $V_0, V_1, V_2, V_3$ and $V_4$ may be considered. Each measurement is performed at a sampling interval Δt.

This gives, for example $V_0=V(t)$, $V_2=V(t-\Delta t)$, $V_2=V(t=2\Delta t)$, $V_3=V(t-3\Delta t)$ and $V_4=V(t-4\Delta t)$.

A MAC LAURIN type series expansion for the different velocities velocity $V_0, V_1, V_2, V_3$ and $V_4$ leads to:

$$V(t - k\Delta t) = V^{(0)} - \frac{k\Delta t}{1!}V^{(1)} + \frac{k^2\Delta t^2}{2!}V^{(2)} - \frac{k^3\Delta t^3}{3!}V^{(3)} + \frac{k^4\Delta t^4}{4!}V^{(4)} + \ldots$$

Expression in which the terms $V^{(n)}$ are derivatives of rank n of velocity V. In this expansion, the derivative order terms of over 4 are ignored.

In writing this expression for the five values measured for V, we obtain a system with five linear equations with five unknowns ($V^{(0)}, V^{(1)}, V^{(2)}, V^{(3)}$ and $V^{(4)}$. Only unknown $V^{(2)}$ (first derivative of V) is needed to determine the acceleration components.

The resolution of this system gives the value of derivative $V^{(1)}$ according to the five successive measurements of V, that is:

$$V^{(1)}=(25/12V_0-4V_1+3V_2-16/12V_3+3/12V_4)/\Delta t$$

This expression is applied to the calculation of each of the acceleration components from each of the components of the five velocities measured.

It is thus easy to deduce the three acceleration components ($\Gamma_x, \Gamma_y, \Gamma_z$) in the land reference according to the sampling period Δt and the components of the five successive velocities measured.

We may thus write:

$$\Gamma x = \frac{\sum_{k=0}^{4} f_k V_{xk}}{\Delta t}$$

$$\Gamma y = \frac{\sum_{k=0}^{4} f_k V_{yk}}{\Delta t}$$

$$\Gamma z = \frac{\sum_{k=0}^{4} f_k V_{zk}}{\Delta t}$$

Expressions in which the $f_k$ correspond to the coefficients of the expression $V^{(1)}$ above, that is:
$f_0=25/12$, $f_1=4$, $f_2=3$, $f_3=-16/12$, $f_4=3/12$
$V_{xk}$, $V_{yk}$, $V_{zk}$ are the three components of a measured vector $v_k$, g is the acceleration of the gravity.

The measurement period $\Delta t$ will be selected according to the frequencies of the projectile's pendular motion. One $\Delta t$ will be adopted of around 0.10 seconds for a projectile having a pendular motion frequency of around 1 Hz.

During a second stage in the process according to the invention, the so-called corrected acceleration values will be calculated:

$\gamma_{CX}=\gamma_X\Gamma/\gamma$; $\gamma_{CY}=\gamma_Y\Gamma/\gamma$; $\gamma_{CZ}=\gamma_Z\Gamma/\gamma$ expressions in which $\Gamma=\sqrt{\Gamma_X^2+\Gamma_Y^2+\Gamma_Z^2}$ is the norm of the projectile's acceleration vector in the land reference such as calculated by the GPS locating system and $\gamma=\sqrt{\gamma_X^2+\gamma_Y^2+\Gamma_Z^2}$ is the norm of the projectile's acceleration vector in the reference linked to the projectile such as measured by the onboard inertial unit.

This calculation works on the premise that the norm $\Gamma$ measured by the GPS is the most correct value. A corrective coefficient $\Gamma/\gamma$ merely has to be applied, therefore, to the acceleration values $\gamma_X$, $\gamma_Y$ and $\gamma_Z$ measured by the inertial unit to obtain corrected values close to what the inertial unit should measure in the reference linked to the projectile. This correction is applied to all future utilisations of the $\gamma$. The correction is applied to the accelerations measured in the mobile reference and not to the angular roll, pitch and yaw velocities which are required to calculate the Euler angles by integration.

If the expressions giving the acceleration components in the fixed reference are compared to the acceleration components in the mobile reference linked to the projectile, we observe that a simple term by term comparison does not allow the Euler angles to be evaluated unequivocally from the measurements. Indeed, there is a persistent uncertainty which requires at least one of the angles to be evaluated by another method (for example the roll angle).

According to a first embodiment of the invention, this measurement will be made, for example, by means of a specific sensor such as a magnetometer. The process according to the invention thus enables deviations of the inertial unit to be corrected by replacing the acceleration values measured by corrected values taking into account the data provided by the GPS.

According to a preferred embodiment of the invention, more particularly adapted to the canard type projectile (that is to say one piloted by elevons arranged on its front part) and so as to further reduce the cost of the guidance system, the invention advantageously proposes a process enabling such uncertainties to be removed without it being necessary to provide other roll measurement means.

This uncertainty will be removed by the calculation of the constant of the incidence time $\Lambda$ of the projectile.

Classically, the incidence time constant is a variable which, for a given altitude and at a given velocity, characterises the manoeuvrability of a projectile.

For a canard projectile (that is to say piloted by elevons 8 arranged at its front part), the lift is practically independent of the deflection of the elevon plane, and the incidence time constant is equal to:

$$\Lambda = \frac{mV}{\bar{q}SC_{Z\alpha}}.$$

Expression in which $\bar{q}$ is the value of the dynamic pressure ($\bar{q}=0.7\ p_a M^2$, expression in which $p_a$ is the atmospheric pressure at the altitude in question and M the Mach number), $C_{Z\alpha}$ is the aerodynamic lift gradient, S the projectile's reference area and m the projectile's mass.

Figure 3:
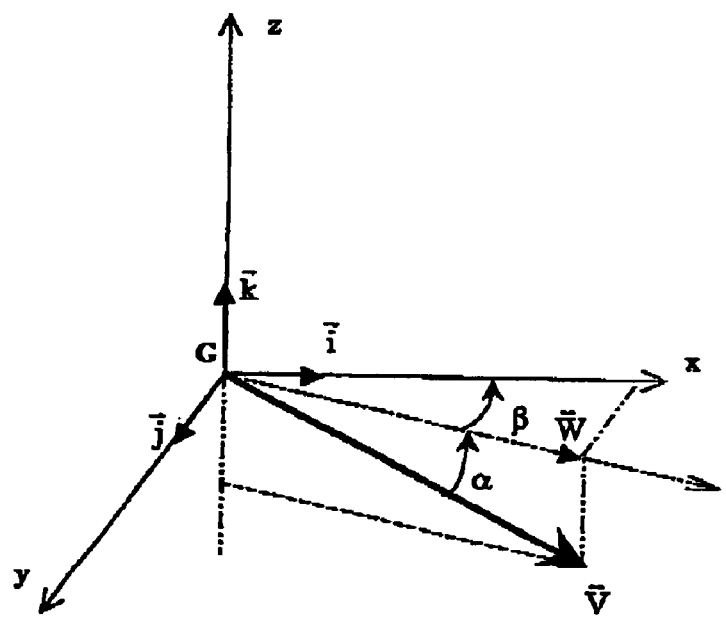
FIG. 3 is a schema locating the angles of incidence and slip for a projectile with respect to a reference linked to the projectile.

FIG. 3 shows the reference linked to the projectile Gx, Gy, Gz and enables the incidence $\alpha$ and slip $\beta$ angles of the projectile to be located. In a known manner, the incidence angle $\alpha$ is defined as opposed to the velocity vector V angle with the GxGy plane of the projectile, and the slip angle $\beta$ is defined as opposed to the angle between the projection w of the velocity vector on the GxGy plane and the axis Gx.

The incidence time constant allows the acceleration transversal component values ($\gamma_y$ and $\gamma_z$) to be expressed in the reference linked to the projectile and according to the velocity V of the projectile.

We thus write: $\gamma_y = v\beta/\Lambda$ and $\gamma_z = V\alpha/\Lambda$

If, moreover, we consider that the slip and incidence angles are small (which is generally the case for an artillery projectile since its architecture is defined so as to reduce drag, these angles are thus less than or equal to 6°), and that the wind speed is ignored, considered as a disturbance of mean nil, the velocity V may be written in the vectorial form:

$\vec{V}=U\vec{i}-V(\beta\vec{j}+\alpha\vec{k})$. $\vec{i},\vec{j},\vec{k}$ being unitary vectors on the three axes Gx, Gy, Gz and $\bar{U}$ being the norm of the projection of the velocity vector V on axis Gx of the projectile.

By replacing the slip and incidence angles by their expression according to the transversal accelerations $\gamma_y$ and $\gamma_z$, this expression allows the incidence time constant to be expressed according to U, V, $\gamma_y$ and $\gamma_z$. We will thus write:

$\vec{V}=U\vec{i}-\Lambda(\gamma_y\vec{j}+\gamma_z\vec{k})$

Thereby enabling, by expressing the norm squared of the vectors: $U^2=V^2-\Lambda^2\gamma_T^2$.

Expression in which $\gamma_T^2=\gamma_y^2+\gamma_z^2$.

Moreover, the scalar product of the velocity vector and the non-gravitational acceleration vector $P_S=\vec{V}\vec{\Gamma}$ is also written:

$P_s=\gamma_x U-\Lambda\gamma_T^2$.

It is thus possible for the incidence time constant $\Lambda$ to be calculated directly from the values measured or calculated of the components of vectors V, $\Gamma$ (fixed reference) and the components measured of the acceleration within the projectile reference ($\gamma_x$, $\gamma_y$, $\gamma_z$).

$\Lambda$ is thus the solution to a second degree equation:

$\Lambda^2\gamma_T^2\Gamma^2+2\Lambda\gamma_T^2 P_S+P_S^2-\gamma_x^2 V^2=0$

Two cases may be envisaged.

Either the projectile is in its ballistic phase, elevons retracted, or the projectile is in its controlled flight phase.

In the case of a cannon-fired spinning projectile, the two phases occur successively. The ballistic phase occurs first. It corresponds to firing by the cannon. No piloting is provided during this phase. However, the electronic circuits will be advantageously activated and initialised during this ballistic phase and it will be advantageous also to correct the Euler angles to allow proper piloting of the projectile as soon as it enters the controlled phase.

The controlled flight phase is that in which the aerodynamic piloting elevons are deployed and activated so as to obtain a substantially rectilinear trajectory converging towards the designated target.

During this phase, the projectile is subjected to transversal aerodynamic drag which approximately offsets the weight of the projectile.

Preferably and classically, so as to reduce the load factors, the transition between the ballistic phase and the controlled flight phase (and thus the deployment of the canard elevons) is carried out when the angle of the velocity vector of the projectile with the horizontal plane is equal to or less than the angle made with this same horizontal plane and the straight line connecting the projectile and the target.

The moment of transition is easily determined by calculation using the GPS measurement of the velocity vector and the position of the projectile in the land reference.

Indeed, the target's coordinates were programmed before firing or in the first moments of the trajectory and the onboard calculator can evaluate for each GPS localisation the orientation of the straight line connecting the projected and the target then compare it to the velocity vector measured.

During the controlled flight phases for each GPS localisation the incidence time $\Lambda$ constant is calculated solving the second degree equation given above. Which gives:

$$\Lambda = \frac{-Ps - \sqrt{\Delta'}}{\Gamma^2}$$

In this expression $P_s$ is the scalar product of the velocity vector $\vec{V}$ measured and the acceleration vector $\vec{\Gamma}$ calculated from the GPS ($Ps = \vec{V} \cdot \vec{\Gamma}$), $\alpha'$ is the discriminant reduced from the equation and is equal to:

$$\Delta' = (\Gamma^2 V^2 - P_S^2) \frac{\gamma_x^2}{\gamma_T^2}.$$

Expression in which $\gamma_T$ is the value of the acceleration transversal to the projectile ($\gamma_T^2 = \gamma_y^2 + \gamma_z^2$).

All the calculations will naturally be made by replacing the acceleration values measured by the inertial unit ($\gamma_X, \gamma_Y, \gamma_Z, \gamma_T$) by the corrected values ($\gamma_{CX}, \gamma_{CY}, \gamma_{CZ}, \gamma_{cT}$).

$\gamma_{CX} = \gamma_X \Gamma/\gamma; \gamma_{CY} = \gamma_Y \Gamma/\gamma; \gamma_{CZ} = \gamma_Z \Gamma/\gamma; \gamma_{cT}^2 = \gamma_{cy}^2 + \gamma_{cz}^2$.

The Euler angles are thereafter determined by calculation. For this, the vectorial expressions:

$\vec{V} = U\vec{i} - \Lambda(\gamma_{cy}\vec{j} + \gamma_{cz}\vec{k})$ and $\vec{\Gamma} = \gamma_{cx}\vec{i} + \gamma_{cy}\vec{j} + \gamma_{cz}\vec{k}$ merely need to be combined term by term.

This allows the transversal acceleration to be eliminated, and gives: $\vec{V} + \Lambda \vec{\Gamma} = (U + \Lambda \gamma_{cx})\vec{i}$ The components of this vectorial sum on the axes of the fixed reference are thus:

$V_x + \Lambda \Gamma_z = (U + \Lambda \gamma_{cx})\vec{i}\vec{I}$ $V_y + \Lambda \Gamma_y = (U + \Lambda \gamma_{cx})\vec{i}\vec{J}$ $V_z + \Lambda \Gamma_x = (U + \Lambda \gamma_{cx})\vec{i}\vec{K}$ The definition of the Euler angles being:

$\vec{i}\vec{I} = \cos\theta \cos\psi$ $\vec{i}\vec{J} = \cos\theta \sin\psi$ $\vec{i}\vec{K} = \sin\theta$.

The different Euler angles can be easily deduced with no uncertainties from the following formulae;

Pitch angle $\theta$ (between $-\pi/2$ and $+\pi/2$)

$$\theta = \arcsin\left(\frac{V_z + \Lambda \Gamma_z}{U + \Lambda \gamma_{cx}}\right)$$

Yaw angle $\psi$ between $-\pi$ and $+\pi$):

$$\cos\psi = \frac{V_x + \Lambda \Gamma_x}{(U + \Lambda \gamma_{cx})\cos\theta}$$

$$\sin\psi = \frac{V_y + \Lambda \Gamma_y}{(U + \Lambda \gamma_{cx})\cos\theta}$$

The roll angle requires another calculation which enters the successive scalar products term by term from the expression $$\gamma_{cy}\vec{j} + \gamma_c\vec{k} = \frac{U\vec{i} - \vec{V}}{\Lambda}$$

into the unitary vectors $\vec{I}\vec{J}\vec{K}$ of the fixed reference.

(This expression comes from the equality already encountered:

$\vec{V} = U\vec{i} - \Lambda(\gamma_{cy}\vec{j} + \gamma_{cz}\vec{k})$

The roll angle is deduced after solving the equations obtained. The different scalar products of the unitary vectors are naturally well known to the expert. They are given by the matrix allowing the passage from a projectile reference to a fixed reference with the Euler angles.

The roll angle $\phi$ is thus defined by:

$$\cos\varphi = \frac{\gamma_{z0}\gamma_c + \gamma_{z0}\gamma_{cy}}{\gamma_{cy}^2 + \gamma_{cz}^2}$$

$$\sin\varphi = \frac{\gamma_{z0}\gamma_{cy} + \gamma_{y0}\gamma_c}{\gamma_{cy}^2 + \gamma_{cz}^2}$$

Expressions in which:

$\gamma_{y0} = (V_x \sin\psi - V_Y \cos\psi)/\Lambda$, $\gamma_{z0} = (U \sin\theta - V_Z)/\Lambda \cos\theta$ and $U^2 = V^2 - \Lambda^2 \gamma_{cT}^2$.

When the projectile is in the ballistic flight phase, the velocity vector is directed along the projectile's axis (wind being assumed nil, which is a hypothesis whose validity has been verified by statistical simulations). In this case, the transversal acceleration $\gamma_T$ is close to zero. The previous formulae giving the pitch and yaw angles remain valid by arbitrarily setting: $\Lambda=0$. This gives:

$\theta=\arcsin(V_Z/V)$; $\psi=\arcsin(V_Y/V\cos\theta)$ (U being in this case equal to V).

The roll angle, however, is expressed to an accuracy of $2\pi$ according to the angular pitch (q) and yaw (r) velocities measured by the onboard inertial unit.

$$\cos\varphi = \frac{q}{\sqrt{q^2+r^2}} \quad \sin\varphi = \frac{-r}{\sqrt{q^2+r^2}}$$

Naturally, the process according to the invention will be implemented by a programming algorithm incorporated into a memory or register of the electronic calculator 11 of the projectile. This calculator incorporates, additionally, the other algorithms ensuring the piloting of the projectile, that is to say the elevon 8 commands according to the navigation law retained. These piloting algorithms are not described here and are not the subject of the present invention.

By way of example, Monte Carlo simulations have been made with a 155 mm, sub calibre, fin-stabilised artillery projectile piloted by two canard planes.

The main common data taken into account are the following:

The natural frequency of the pendular motion of the piloted projectile is close to 1 Hz.

The mean spin rate is close to 5 Hz.

The GPS localisation frequency is close to 10 Hz, the error module used conforms to P/Y military GPS norms.

The wind is considered as a random variable with normal distribution with mean nil in a given direction. The digital values used come from MIL STD 201 B.

The inertial unit is equipped with roll, pitch and yaw gyros whose errors are independent, normal and characterised by the following standard deviations:

Skew (error at spin velocity ail): 0.03°/s
Proportionality: $0.4 \cdot 10^{-3}$

The inertial unit is also equipped with accelerometers whose normal and independent errors are characterised by the following standard deviations:

Skew (error at acceleration nil): 0.1 m/s$^2$
Proportionality: $2 \cdot 10^{-3}$ Simulations have been made of:

firstly, a classical initialisation method, assumed perfect, according to which the projectile's axis is aligned with a direction of the velocity vector, at the end of the ballistic phase, the roll angle being estimated during a preliminary piloting phase, by successively applying reference piloting orders, and secondly, the process according to the invention in which the Euler angles are periodically re-evaluated and the accelerations measured by the inertial unit are systematically corrected according to the values calculated by the GPS.

The table hereafter presents the performances obtained in each case. The different parameters measured are defined as follows:

The maximal range is the maximal target range with decametric accuracy with wind nil.

The accuracy obtained at 60 km is that obtained by rounds effectively reaching the vicinity of the target (equiprobable radius value).

Firing reliability at 60 km is equal to the proportion of the number of rounds effectively reaching the vicinity of the target.

The following table presents a comparison of the results obtained by numerical simulation using the Monte Carlo method.

|  | Maximal range | Accuracy at 60 km | Firing reliability at 60 km |
| --- | --- | --- | --- |
| Traditional process | 61 km | <10 m | ≈60% |
| Process according to the invention | 65 km | <10 m | >99% |

In this example, therefore, we observe that the process according to the invention enables the firing range to be substantially increased (6% higher) but above all that this process significantly improves firing reliability, which is greater than 99%.

This reliability is ensured, moreover, with a low cost inertial unit of average performance.

The invention has been described here in application to the firing of a cannon-fired gliding projectile.

It is naturally possible for it to be implemented in any type of guided projectile, such as a rocket, drone or missile. The process thus allows costs to be reduced, for equivalent performances, by enabling the use of less sophisticated inertial components.

What is claimed is:

1. A process used in a computation device of a spinning projectile to control the trajectory of the spinning projectile and an inertial unit in the spinning projectile measures the projectile's accelerations in three axes within a reference linked to the projectile so as to prepare the piloting commands for the projectile's trajectory, wherein:

measuring the velocity vector V components $(V_X, V_Y, V_Z)$ of the projectile using a global positioning system (GPS) along three axes and within a land reference $(G_X, G_Y, G_Z)$ evaluating based on the velocity vector component measurements, the components $(\Gamma_X, \Gamma_Y, \Gamma_Z)$ of the acceleration vector $\Gamma$ in the same land reference (GX, GY, GZ); and recalculating, at each of the measurements and periodic evaluations by the GPS, the Euler angles of the projectile by combining the resultants of the velocity (V) and acceleration ($\Gamma$) measurements given by the GPS and those of the acceleration given by the inertial unit in order to adjust a piloting device of the spinning projectile.

2. The process according to claim 1, wherein for the calculations of the Euler angles used for piloting, instead of the acceleration values measured by the inertial unit, so-called corrected acceleration values are used:

$\gamma_{CX}=\gamma_X\Gamma/\gamma$; $\gamma_{CY}=\gamma_Y\Gamma/\gamma$; $\gamma_{CZ}=\gamma_Z\Gamma/\gamma$ expressions in which $\Gamma=\sqrt{(\Gamma_X^2+\Gamma_Y^2+\Gamma_Z^2)}$ is the norm of the projectile's acceleration vector in the land reference such as evaluation thanks to the positioning system and $\gamma=\sqrt{(\gamma_X^2+\gamma_Y^2+\gamma_Z^2)}$ is the norm of the projectile's acceleration vector in the reference linked to the projectile such as measured by the inertial unit.

3. The process according to claim 2 having a canard type architecture, wherein the evaluation of the Euler angles is carried out by the computation device during the piloted flight phase using a calculation of the constant of the incidence time $$\Lambda = \frac{-P_S - \sqrt{\Delta'}}{\Gamma^2},$$

expression in which $P_S$ is the scalar product of the velocity vector V and the acceleration vector $\Gamma$ measured or calculated from the GPS ($P_S = \vec{V} \cdot \vec{\Gamma}$), and $\Delta'$ is a reduced discriminant $$\Delta' = (\Gamma^2 V^2 - P_S^2) \frac{\gamma_{CX}^2}{\gamma_{CT}^2},$$

expression in which $\gamma_{CT}$ is a corrected value of the transversal acceleration of the projectile ($\gamma_{CT} = \sqrt{(\gamma_{CY}^2 + \gamma_{CZ}^2)}$).

4. The process according to claim 3, wherein, when the projectile is in the piloted flight phase:
the Euler angles of the projectile are evaluated by the following formulae:
pitch angle $\theta$ (between $-\pi/2$ and $+\pi/2$):

$$\theta = \arcsin\left(\frac{V_Z + \Lambda \Gamma_Z}{U + \Lambda \gamma_{CX}}\right)$$

yaw angle $\psi$ (between $-\pi$ and $+\pi$):

$$\cos\psi = \frac{V_X + \Lambda \Gamma_X}{(U + \Lambda \gamma_{CX})\cos\theta}$$

$$\sin\psi = \frac{V_Y + \Lambda \Gamma_Y}{(U + \Lambda \gamma_{CX})\cos\theta}$$

roll angle $\phi$:

$$\cos\varphi = \frac{\gamma_{Z0}\gamma_{cz} + \gamma_{Y0}\gamma_{cy}}{\gamma_{cy}^2 + \gamma_{cz}^2}$$

$$\sin\varphi = \frac{\gamma_{Z0}\gamma_{cy} + \gamma_{y0}\gamma_{cz}}{\gamma_{cy}^2 + \gamma_{cz}^2}$$

expressions in which:

$\gamma_{Y0} = (V_X \sin\psi - V_Y \cos\psi)/\Lambda,$ $\gamma_{Z0} = (U \sin\theta - V_Z)/\Lambda\cos\theta$ and $U^2 = V^2 - \Lambda^2 \Gamma_{cT}^2.$ 5. The process according to claim 4, wherein the evaluation of the components ($\Gamma_X, \Gamma_Y, \Gamma_Z$) of the acceleration vector $\Gamma$ in the land reference ($G_X, G_Y, G_Z$) will be carried out from N periodical measurements made by the GPS of components ($V_X, V_Y, V_Z$) of the velocity vector V of the projectile in the same land reference and with a sampling interval $\Delta t$, measurements to which a KALMAN filter will be applied.

6. The process according to claim 3, wherein, when the projectile is in the ballistic flight phase, the value of the incidence time constant $\Lambda$ will be rounded up to zero and the projectile's Euler angles will be calculated by the computation device using the following formulae:
the pitch $\theta$ and yaw $\psi$ angles are equal to:

$\theta = \arcsin(V_Z/V); \psi = \arcsin(V_Y/V \cos\theta)$ the roll angle $\phi$ being defined by:

$$\cos\varphi = \frac{q}{\sqrt{q^2 + r^2}} \quad \sin\varphi = \frac{-r}{\sqrt{q^2 + r^2}}$$

expressions in which q and r are respectively the angular pitch and yaw velocities of the projectile in a reference linked to the projectile, velocities measured by the inertial unit.

7. The process according to claim 3, wherein the evaluation of the components ($\Gamma_X, \Gamma_Y, \Gamma_Z$) of the acceleration vector $\Gamma$ in the land reference ($G_X, G_Y, G_Z$) will be carried out from N periodical measurements made by the GPS of components ($V_X, V_Y, V_Z$) of the velocity vector V of the projectile in the same land reference and with a sampling interval $\Delta t$, measurements to which a KALMAN filter will be applied.

8. The process according to claim 2, wherein, when the projectile is in the ballistic flight phase, the value of the incidence time constant $\Lambda$ will be rounded up to zero and the projectile's Euler angles will be calculated by the computation device using the following formulae:
the pitch $\theta$ and yaw $\psi$ angles are equal to:

$\theta = \arcsin(V_Z/V); \psi = \arcsin(V_Y/V \cos\theta)$ the roll angle $\phi$ being defined by:

$$\cos\varphi = \frac{q}{\sqrt{q^2 + r^2}} \quad \sin\varphi = \frac{-r}{\sqrt{q^2 + r^2}}$$

expressions in which q and r are respectively the angular pitch and yaw velocities of the projectile in a reference linked to the projectile, velocities measured by the inertial unit.

9. The process according to claim 8, wherein the evaluation of the components ($\Gamma_X, \Gamma_Y, \Gamma_Z$) of the acceleration vector $\Gamma$ in the land reference ($G_X, G_Y, G_Z$) will be carried out from N periodical measurements made by the GPS of components ($V_X, V_Y, V_Z$) of the velocity vector V of the projectile in the same land reference and with a sampling interval $\Delta t$, measurements to which a KALMAN filter will be applied.

10. The process according to claim 2, wherein the evaluation of the components ($\Gamma_X, \Gamma_Y, \Gamma_Z$) of the acceleration vector $\Gamma$ in the land reference ($G_X, G_Y, G_Z$) will be carried out from N periodical measurements made by the GPS of components ($V_X, V_Y, V_Z$) of the velocity vector V of the projectile in the same land reference and with a sampling interval $\Delta t$, measurements to which a KALMAN filter will be applied.

11. The process according to claim 1, wherein the evaluation of the components $(\Gamma_X, \Gamma_Y, \Gamma_Z)$ of the acceleration vector $\Gamma$ in the land reference $(G_X, G_Y, G_Z)$ will be carried out from N periodical measurements made by the GPS of components $(V_X, V_Y, V_Z)$ of the velocity vector V of the projectile in the same land reference and with a sampling interval $\Delta t$, measurements to which a KALMAN filter will be applied.

* * * * *